United States Patent
Guillaume et al.

(10) Patent No.: US 9,365,675 B2
(45) Date of Patent: *Jun. 14, 2016

(54) ISOCYANTATE-FREE METHOD FOR PREPARING POLY(CARBONATE-URETHANE) OR POLY(ESTER-URETHANE)

(71) Applicants: TOTAL RESEARCH & TECHNOLOGY FELUY, Seneffe (Feluy) (BE); CENTRE NATIONAL DE LA RECHERCHE SCIENTIFIQUE (CNRS), Paris (FR)

(72) Inventors: Sophie Guillaume, Vitre (FR); Marion Helou, Brussels (BE); Jean-François Carpentier, Acigne (FR); Martine Slawinski, Nivelles (BE)

(73) Assignees: Total Research & Technology Feluy, Seneffe (BE); Centre National de la Recherche, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,499

(22) Filed: Jun. 3, 2015

(65) Prior Publication Data
US 2015/0267001 A1 Sep. 24, 2015

Related U.S. Application Data

(63) Continuation of application No. 13/809,907, filed as application No. PCT/EP2011/060300 on Jun. 21, 2011, now Pat. No. 9,080,016.

(30) Foreign Application Priority Data

Jul. 15, 2010 (EP) .................................... 10290398

(51) Int. Cl.
C08G 64/00 (2006.01)
C08G 71/04 (2006.01)
C08G 64/30 (2006.01)
C08G 64/02 (2006.01)

(52) U.S. Cl.
CPC ............ *C08G 71/04* (2013.01); *C08G 64/0208* (2013.01); *C08G 64/0216* (2013.01); *C08G 64/0225* (2013.01); *C08G 64/0241* (2013.01); *C08G 64/305* (2013.01)

(58) Field of Classification Search
CPC ............. C08G 64/305; C08G 64/0208; C08G 64/0216; C08G 64/0241; C08G 64/0225; C08G 71/04
See application file for complete search history.

(56) References Cited

U.S. PATENT DOCUMENTS

2009/0062482 A1* 3/2009 Blum et al. .................... 525/450

*Primary Examiner* — Michael L Leonard
(74) *Attorney, Agent, or Firm* — Albert Shung

(57) ABSTRACT

Poly(carbonate-urethane) or poly(ester-urethane) may be characterized in that of carbonate soft segments have molecular weights Mn ranging between 10,000 and 250,000 g/mol. The segments' length may be monitored by the ring-opening polymerization condition. The process of preparing the poly (carbonate-urethane) or poly(ester-urethane) may include immortal ring-opening polymerization of a cyclic carbonate or of a cyclic ester or diester monomers in the presence of a first catalyst system and diols or polyols. The process may include chemical modification of the hydroxyl chain-end groups into carboxylic groups in the presence of a second catalyst system. The process may include a coupling reaction with at least 2 equivalents of a second cyclic carbonate, enabling coupling with the carboxylic moiety in the presence of a third catalyst system. The process may include polyaddition of a diamine or a polyamine via ring-opening of the second cyclic carbonate, and obtention of poly(carbonate-urethane) or poly(ester-urethane).

17 Claims, 4 Drawing Sheets

ISOCYANTATE-FREE METHOD FOR PREPARING POLY(CARBONATE-URETHANE) OR POLY(ESTER-URETHANE)

This application is a Continuation of U.S. patent application Ser. No. 13/809,907, filed on Feb. 25, 2013, which is a National Stage Entry of PCT/EP2011/060300, filed on Jun. 21, 2011, which claims priority from EP 10290398.6, filed on Jul. 15, 2010.

FIELD OF THE INVENTION

The present invention discloses a method for preparing poly(carbonate-urethane) or poly(ester-urethane) without isocyanate.

DESCRIPTION OF THE RELATED ART

Polyurethanes (PUs) are widely used as paints, coatings, foams, adhesives, packaging in numerous fields such as automotive and consumer or domestic goods industries and in construction engineering or medicine as disclosed for example in Krol (P. Krol, Prog. Mater. Sci., 2007, 52, 915-1015), or in Szycher (M. Szycher, Szycher Handbook of polyurethanes; CRC press: Boca Raton, Fla., 1999) or in Matsumura et al. (S. Matsumura, Y. Soeda, K. Toshima Appl. Microbial. Biotechnol. 2006, 70, 12-20) or in Jayakumar et al. (R. Jayakumar, S. Nanjundan, M. Prabaharan, React. Funct. Polym. 2006, 66, 299-314). Indeed, the performances and chemical, thermal or mechanical properties of PUs cover a large range that is tailored by the nature of the reagents used and by the preparation methods, including both synthetic and processing methods. PUs are potential and reliable substitutes to petrochemical derived polymers. Taking into account their large production volumes, as they stand among the top five prime polymeric materials, the valorisation of renewable resources in their synthesis is currently of great concern.

PUs are generally prepared by polyaddition of diisocyanates and bi- or multi-functional polyols or hydroxyl terminal groups. PUs are thus multiblock copolymers of type $(A-B)_n$, including alternating hard and soft sequences. The soft flexible segments most commonly arise from polyether, polyester or polycarbonate dials. The hard rigid segments most often consist of short-chain diisocyanates that impart physical crosslinking through hydrogen bonding thereby leading to higher melting temperature Tm than aliphatic polyesters or polycarbonates. The macrodiols are biocompatible and biodegradable and presently easily derived from biomass. The isocyanates, obtained from phosgene, on the contrary, raise severe toxicity issues. Many efforts have thus been dedicated to minimise the amount of diisocyanates involved in the preparation of PU or even better to develop non-phosgene and non-isocyanate approaches to PUs in order to improve their biodegradation and chemical recycling. These various approaches and concerns have been disclosed for example in Rokicki and Piotrowska (G. Rokicki, A. Piotrowska Polymer 2002, 43, 2927-2935) or in Petrovic (Z. S. Petrovic, Polymer Reviews, 2008, 48, 109-155) or in Rokicki and Wojciechowski (G. Rokicki, C. Wojciechowski J. Appl. Polym. Sci. 1990, 41, 647-659) or in Hojabri and Kong (L. Hojabri, X. Kong, S. S. Narine Macromolecules, 2009, 10, 884-891) or in Gomez and Varela (R. V. Gomez, O. Varela, Macromolecules, 2009, 42, 8112-8117) or in Williams et al. (C. K. Williams et al. Polym. Rev. 2008, 48, 1-10) or in Tomita et al. (H. Tomita, F. Sanda, T. Endo, J. Polym. Sci A Polym. Chem. 2001, 39, 3678-3685; H. Tomita, F. Sanda, T. Endo J. Polym. Sci A Polym. Chem. 2001, 39, 860-867; H. Tomita, F. Sanda, T. Endo J. Polym. Sci. A Polym. Chem. 2001, 39, 851-859; H. Tomita, F. Sanda, T. Endo, Macromolecules. 2001, 34, 7601-7607; H. Tomita, F. Sanda, T. Endo, J. Polym. Sci A Polym. Chem. 2001, 39, 4091-4100; H. Tomita, F. Sanda, T. Endo, J. Polym. Sci A Polym. Chem. 2001, 39, 162-168), or in Ochiai et al. (B. Ochiai, Y. Satoh, T. Endo, J. Polym. Sci A Polym. Chem. 2007, 45, 3408-3414; B. Ochiai, J. Nakayama, M. Mashiko, T. Nagasawa, Y. Kanedo, T. Endo, J. Polym. Sci. A Polym. Chem. 2005, 43, 5899-5905; B. Ochiai, Y. Satoh, T. Endo, Green Chem. 2005, 7, 765-767; B. Ochiai, S. Inoue, T. Endo, J. Polym. Sci A Polym. Chem. 2005, 43, 6282-6286) or in Kihara et al. (N. Kihara, Endo J. Polym. Sci. A Polym. Chem. 1993, 31, 2765-2773; N. Kihara, Endo J. Polym. Sci. A Polym. Chem. 1993, 31, 2765-2773; N. Kihara, Y. Kushida, Endo J. Polym. Sci. A Polym. Chem. 1996, 34, 2173-2179) or in Steblyanko et al. (A. Steblyanko, W. Choi, F. Sanda, T. Endo, J. Polym. Sci A Polym. Chem. 2000, 38, 2375-2380).

Some attempts have been made however to use another route. Five-, six- or seven-membered (di)carbonates are known to undergo a polyaddition reaction with nucleophiles such as diamines (aminolysis) leading to the formation of various polyhydroxyurethanes (PHUs) without releasing any volatile byproduct as disclosed for example in Nederberg et al. (F. Nederberg, E. Appel, J. P. K. Tan, S. H. Kim, K. Fukushima, J. Sly, R. Miller, R. M. Waymouth, Y. Y. Yang, J. L. Hedrick Biomacromolecules, 2009, 10, 1460-1468) or in Goodwin et al. (A. P. Goodwin, S. S. Lam, J. M. J. Frechet, J. Am. Chem. Soc. 2007, 129, 6994-6995) or in Ekin and Webster (A. Ekin, D. C. Webster, Macromolecules, 2006, 39, 8659-8668; L. Ubaghs, N. Fricke, H. Keul, H. Hocker Macromol. Rapid Commun. 2004, 25, 517-521) or in Clements (J. H. Clements, Ind. Eng. Chem. Res. 2003, 42, 663-674). These PHUs are characterised by pendant hydroxyl groups that favour high water absorption and provide cross linking sites as well as grafting opportunities for further useful functionalised segments. Five-membered carbonates, due to their stable ring structure, open-polymerise less easily than the six- and seven-membered congeners as described in Rokicki (G. Rokicki, Prog. Polym. Sci. 2000, 25, 259-342). They similarly display slower reactivity towards amines than the six- and seven-membered cyclic carbonates. The PHUs obtained by this method have low number average molecular weight Mn of less than 30 kDa, thus much lower than that of commercial PUs.

Poly(carbonate-urethane)s (PCUs) without pendant hydroxyl groups have recently received some attention, although much less than poly(ester-urethane) and poly(etherurethane). Such PCUs are generally derived from soft carbonate segments of very low molar mass reacted with diisocyanates.

Soeda et al. (Y. Soeda, K. Toshima, S. Matsumara Macromol. Biosci., 2004, 4, 721-728) have reported a synthesis of PCU without such NCO-reactant. This involved first the formation of a diurethanediol having a molar mass of 320 g/mol through ring-opening of TMC with hexamethylenediamine, followed by its polycondensation reaction with diethyl carbonate using a lipase along with anisole and molecular sieves. In that procedure, both soft segments and hard units remained very short, and shorter than the length obtained when using the diisocyanate route that is typically of 1 000 g/mol up to less than 12 000 g/mol. In addition, the reaction conditions required heating over three days at a temperature of 110° C. The process afforded a mixture of PTMCUs having a number average molecular weight $\overline{M}n$ of less than 20 000 g/mol and having three types of chain ends as identified by MALDI-ToF-MS. The yield was of 90% after purification.

Modulating the soft block length remains however in need of optimisation.

It is therefore highly desirable to develop efficient alternative synthetic routes to PCUs which would combine an environmentally-friendly approach, especially free of isocyanates, with the possibility to reach high molar mass PCUs with length-tunable macrocarbonate segments and with a well defined structure.

SUMMARY OF THE INVENTION

It is an objective of the present invention to provide a synthetic route to polyurethane that does not use isocyanates.

It is also an objective of the present invention to elaborate a method allowing to control the length of the soft blocks.

It is another objective of the present invention to valorise renewable resources.

It is yet another objective of the present invention to provide a method for preparing PCUs or polyester urethanes (PEUs) that is environmentally friendly.

In accordance with the present invention, the foregoing objectives are realised as described in the independent claims. Preferred embodiments are described in the dependent claims.

DETAILED DESCRIPTION

Figure 1:
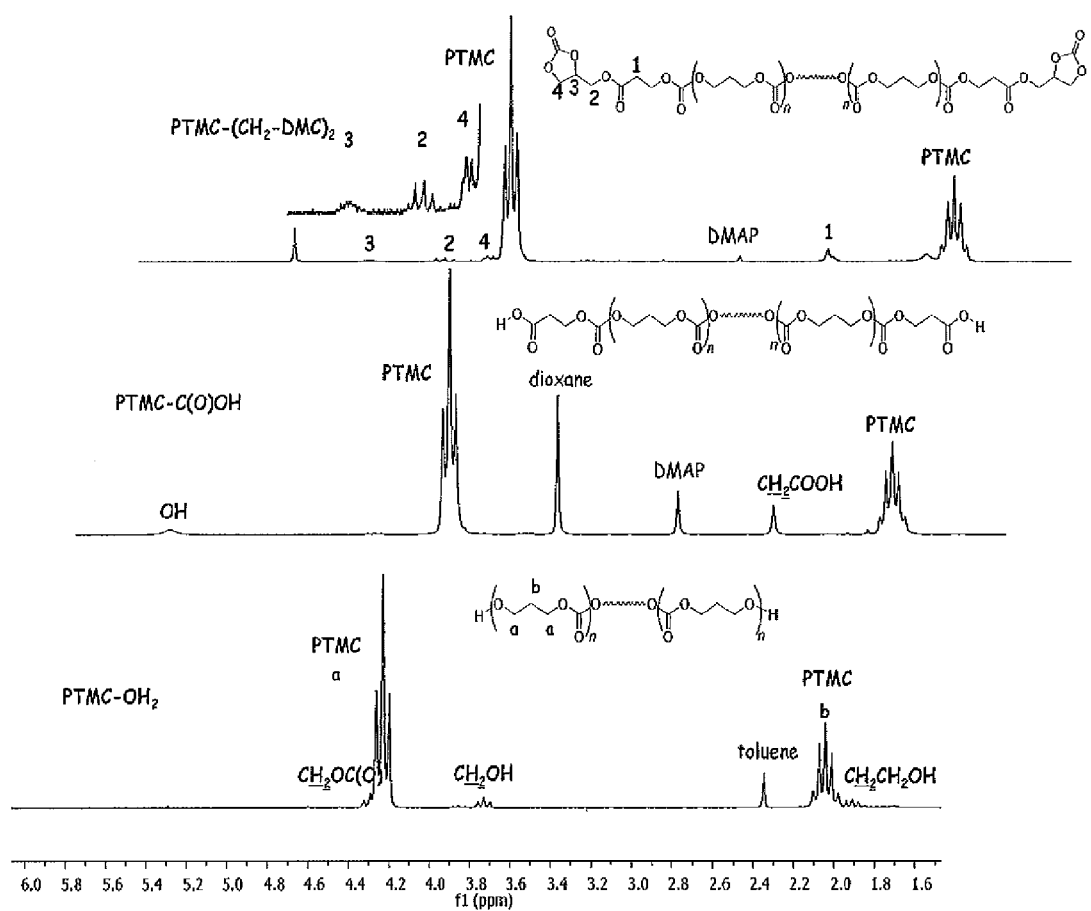
FIG. 1 represents typical $^1$H NMR spectra for PTMC-$(OH)_2$, PTMC-$(COOH)_2$, and PTMC-$(CH_2DMC)_2$ (300 MHz, $CDCl_3$, 20° C.)

Accordingly, the present invention discloses a process for preparing poly(carbonate-urethane) (PCU) or poly(ester-urethane) (PEU) that comprises the steps of:
a) immortal ring-opening polymerisation of a first 5,6,7-membered cyclic carbonate or cyclic ester, bearing or not functional groups, in the presence of a first catalyst system and one or more diols or polyols acting as co-initiators and chain transfer agents;
b) chemical modification of the hydroxyl chain-end groups into carboxylic groups in the presence of a second catalyst system;
c) coupling reaction with at least 2 equivalents of a second 5, 6, or 7-membered cyclic carbonate, bearing at least one functional group enabling coupling with the carboxylic moiety, in the presence of a third catalyst system;
d) polyaddition of a diamine or a polyamine via ring-opening of the second terminal 5, 6, or 7-membered cyclic carbonate of step c);
e) obtention of poly(carbonate-urethane) or poly(ester-urethane)

This method is exemplified schematically in scheme 1 for cyclic carbonates using trimethylene carbonate (TMC) for building the soft polycarbonate blocks and glycerol carbonate (DMC-$CH_2OH$) as the connecting reagent.

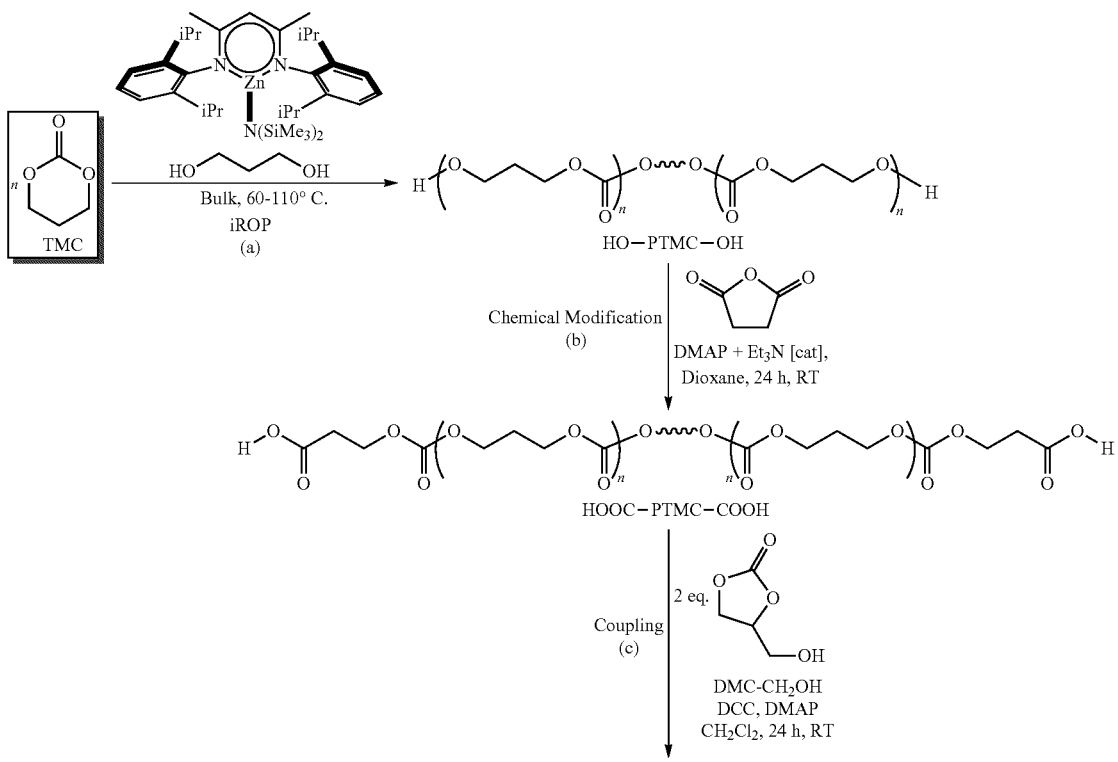

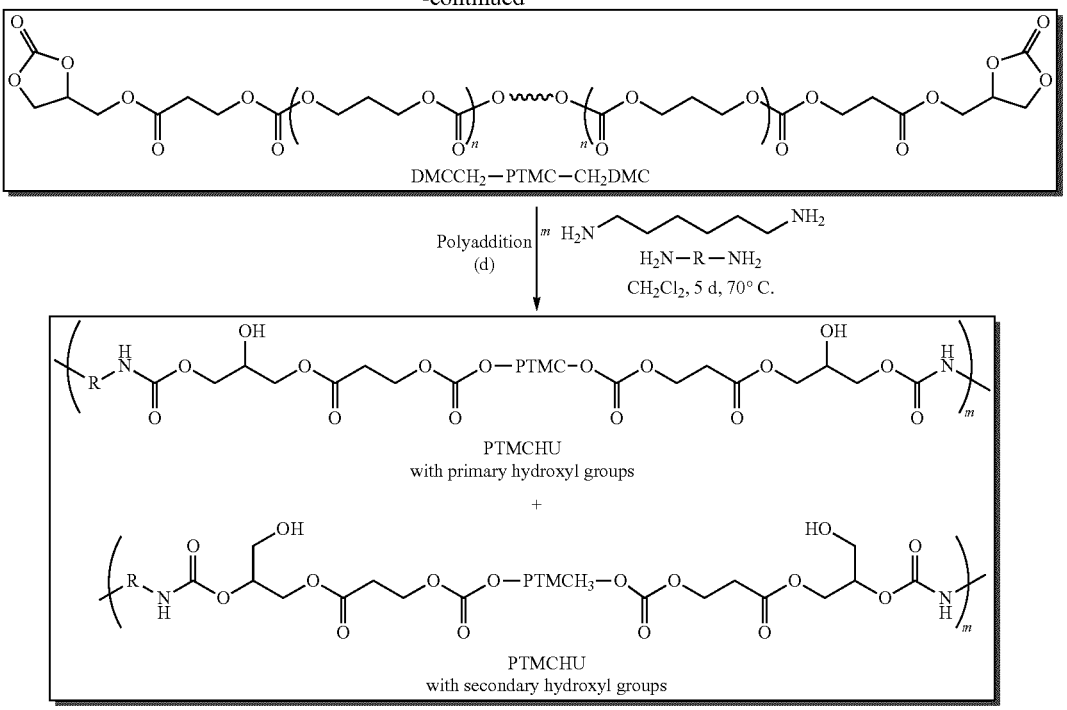

The immortal ring-opening polymerisation of cyclic carbonate or cyclic ester of step a) has been described extensively by the same inventors in co-pending applications EP-A-2096132, EP-A-2151465, EP-09290655.1 and PCT/EP2010/055797 and in several publications (M. Helou, O. Miserque, J.-M. Brusson, J.-F. Carpentier, S. M. Guillaume, *Chem. Eur. J.* 2008, 14, 8772-8775; M. Helou, O. Miserque, J.-M. Brusson, J.-F. Carpentier, S. M. Guillaume, *Adv. Synth. Cat.* 2009, 351, 1312-1324; M. Helou, O. Miserque, J.-M. Brusson, J.-F. Carpentier, S. M. Guillaume, *Macromol. Rapid Commun.* 2009, 30, 2128-2135; M. Helou, O. Miserque, J.-M. Brusson, J.-F. Carpentier, S. M. Guillaume, *Chem. Cat. Chem.* 2010, 2, 306-313; J.-F. Carpentier, C. Guillaume, S. Guillaume, M. Helou, V. Poirier, Y. Sarazin, *J. Chem. Soc. Dalton Trans.* 2010, in press; M. Helou, O. Miserque, J.-M. Brusson, J.-F. Carpentier, S. M. Guillaume, *Chem. Cat. Chem.* 2010, 2, 306-313; V. Poirier, J.-F. Carpentier, Y. Sarazin, *Dalton Trans.* 2009, 9820-9827; C. Guillaume, J.-F. Carpentier, S. M. Guillaume, *Polymer* 2009, 50, 5909-5917).

'Immortal' ring-opening polymerisation (iROP) is particularly attractive as compared to "classical" ROP in that the protic source that is used in large excess as a chain transfer agent enables the growth of a large number of polymer chains per catalytic centre. Provided the transfer reactions are fast and reversible, the amount of catalytic species necessary in iROP is truly catalytic versus both the monomer and the polymer. It can be as low as 10 ppm of metal or organic catalyst. Any toxicity issue regarding the amount of the catalytic system, used in truly low amounts, is thus hardly relevant, as the polymers are virtually free of catalyst residues. Such processes allowed the immortal ring-opening polymerization of trimethylcarbonate (TMC), β-butyrolactone or lactide, where they have remained fully controlled. They have provided well defined polymers, in terms of macromolecular features (molar mass, molar mass distribution, end-group fidelity). In addition, the polymers had high molar masses. These ring-opening polymerisations were carried out in the presence of metal salts, organometallic or organic catalytic systems with very high activities and productivities.

Suitable candidates for the first catalyst system can be found for example in EP-A-2,096,132 They can be selected from metallic complexes of formula $MR_n$ wherein M is a metal Group 1, 2, 3 (including the lanthanide series, hereafter referred as Ln), 8, 12 or 13 of the periodic Table, wherein each R is selected independently from hydrogen, hydrocarbyl radical having from 1 to 12 carbon atoms, alkoxide group OR* wherein R* is linear or branched hydrocarbyl having from 1 to 12 carbon atoms, amido group $NR^{}_2$ wherein R is of general formula $YR^{\#}_3$ wherein Y is Si or C and each $R^{\#}$ is independently selected from hydrogen or hydrocarbyl having from 1 to 12 carbon atoms, borohydride group or halide, and wherein n is the valence of M.

Preferably, M is Mg(II), Ca(II), Y(III), Fe(III), Zn(II), Al(III), or Bi(III)

Preferably each R is selected independently from an amido group such as $N(SiMe_3)_2$, $N(SiHMe_2)_2$, an alkoxide group OR such as OiPr, OMe, $OCH_2Ph$, ..., or a borohydride group ($BH_4$).

More preferably, it is an amido-zinc β-dilminate (BDI) $ZnN(SiMe_3)_2$, or a (LO)ZnR compound where LO is a multidentate phenolate ligand as disclosed for example in WO/EP20101055797 and R is Et or $N(SiMe_3)_2$, or a Lewis acidic metal salt such as a triflate compound $M(OSO_2CF_3)_n$ with M=Al or Bi as disclosed in EP-A-2,151,465.

It can also be selected from an organocatalyst as disclosed in co-pending application EP-09290655.1. The preferred organocatalyst precursors are preferably selected from 4-dimethylaminopyridine (DMAP) or 1,5,7-triazobicyclo-[4,4,0]dec-5-ene (TBD) or tert-butylimino-1,3dimethylperhydro-1,3,2diazaphosphine (BEMP). More preferably, it is BEMP.

The diol or polyol is used in excess and acts as initiator and transfer agent. It can be selected from any polyol of general formula $R(OH)_n$ where n is equal to 2 or more and R is a linear or branched, aliphatic or aromatic hydrocarbyl having up to 20 carbon atoms, or any combination thereof. Most preferably, it is 1,3- and/or 1,2-propanediol and/or glycerol and/or pentaerythritol. These polyols can be derived from bioresources.

The carbonate or ester monomer-to-diol/polyol ratio can be varied in the range 10,000:1 to 10:1; preferentially, it is in the range 1,000:1 to 100:1. The monomer-to-catalyst ratio can be varied in the range 1,000,000:1 to 100:1; preferentially, it is from 500,000:1 to 10,000:1.

The chemical modification of the hydroxyl chain end groups into carboxylic end groups of step b) is carried out in the presence of a second catalyst system. It is described for example in Yu and Zhuo (F. Yu, R. Zhuo, *Polymer J.* 2003, 8, 671-676) or in Lee et al. (S.-H. Lee, S. H. Kim, Y.-K. Han, Y. H. Kim *J. Polym. Sci. A Polym. Chem.* 2001, 39, 973-985) or in Jeon et al. (O. Jeon, S.-H. Lee, S. H. Kim, Y. M. Lee, Y. H. Kim *Macromolecules*, 2003, 36, 5585-5592). It can be carried out by reacting the polycarbonate or polyester obtained in step a) with any suitable anhydride, optionally in an inert solvent selected for example from 2-methyltetrahydrofuran, furan, 1,4-dioxane, or any aliphatic or aromatic hydrocarbon. The second catalyst system can be selected from any suitable catalyst traditionally used for opening of an anhydride with an alcohol. For example, it can be pyridine or a mixture of triethylamine and 4-dimethylaminopyridine (DMAP), loaded in amounts of 0.1 to 5% with respect to the polymer formed in step a) The reaction is carried out at a temperature of from 0 to 80° C., preferably from 15 to 50° C. and more preferably at room temperature for a period of time of 1 hour to 2 days, preferably from 2 to 24 hours.

The coupling reaction of step c) is carried out in the presence of a third catalyst system. It is carried out by reacting at least 2 equivalents of a second 5, 6, or 7-membered cyclic carbonate, bearing at least one functional group enabling coupling with the carboxylic moiety, optionally in the presence of a coupling agent such as dicyclohexylcarbodiimide (DCC) and a suitable catalyst such as for example pyridine or DMAP or N-hydroxybenzotriazole (HOBO loaded in amounts of 0.1 to 5% with respect to the functional cyclic carbonate, optionally in an inert solvent selected for example from 2-methyltetrahydrofuran, furan, dichloromethane or any aliphatic or aromatic hydrocarbon. The reaction can be carried out at room temperature for a period of time of 24 hours.

The polyaddition reaction d) is carried out by adding to the compound obtained in step c) a diamine or a polyamine of general formula $R(NH_2)_n$ where n is equal to 2 or more and R is a linear or branched, aliphatic or aromatic hydrocarbyl having from 1 to 12 carbon atoms, or any combination derived thereof. Preferably, it can be 1,6-hexamethylenediamine. Optionally, the amine can contain a functional group which will provide pendant functions on the main chain. This functional group can be used for various purposes. As non-limiting examples, one can cite: a) vinyl functions which can promote further copolymerisation with other monomers; b) nitroxide functions which can promote controlled radical polymerisation, c) fluorinated pony-tails. The $NH_2$/cyclic carbonate ratio can be varied from 0.5 to 5; more preferably it is from 0.8 to 1.5. This ratio affects the molecular weight of the PCUs or PEUs eventually recovered. For the preparation of high molecular weight PCUs or PEUs, the $NH_2$/cyclic carbonate ratio is preferentially close to 1. The polyaddition reaction d) can be optionally performed in an inert solvent selected for example from 2-methyltetrahydrofuran, furan, 1,4-dioxane, or any aliphatic or aromatic hydrocarbon. The reaction is performed at a temperature ranging from 20° C. to 250° C. Higher temperatures favour the formation of higher molecular weight products.

The present invention also covers poly(carbonate-urethane) or poly(ester-urethane) obtained by the method described hereabove. They are characterised in that the polycarbonate soft segments are long and that the segments' length can be monitored by the ring-opening polymerisation conditions. The long soft polycarbonate segments typically have molecular weights Mn ranging between 10,000 and 250,000 g/mol, preferably between 50,000 and 100,000 g/mol.

EXAMPLES

The bulk iROP of TMC (1.10 g, 10.8 mmol) was carried out at a temperature of 60° C. using a catalytic system based on the amido zinc β-diiminate, $((BDI^{iPr})Zn(N(SiMe_3)_2)$ (7 mg, 0.0108 mmol) and 1,3-propanediol (15.8 μL, 0.218 mmol) as co-initiator and as chain transfer agent. It afforded 1.05 g of α,ω-dihydroxy telechelic PTMCs, PTMC-(OH)$_2$ as seen in Scheme 1 with a yield of 100%. It had a number average molecular weight $M_n$ of 5 060 g·mol$^{-1}$ and a polydispersity index PI defined as the ratio $M_w/M_n$ of the weight average molecular weight $M_w$ over the number average molecular weight $M_n$ of 1.21.

Chemical modification of the hydroxyl chain-end groups into carboxylic groups was then performed as previously reported for polycarbonates as well as polyesters by Yu and Zhuo (F. Yu, R. Zhuo, *Polymer J.* 2003, 8, 671-676) or by Lee et al. (S.-H. Lee, S. H. Kim, Y.-K. Han, Y. H. Kim *J. Polym. Sci. A Polym. Chem.* 2001, 39, 973-985) or by jeon et al. (O. Jeon, S.-H. Lee, S. H. Kim, Y. M. Lee, Y. H. Kim *Macromolecules*, 2003, 36, 5585-5592). Reaction of the above PTMC-(OH)$_2$ (1.05 g, 0.207 mmol) with succinic anhydride (41.5 mg, 0.415 mmol) was carried out in 1,4-dioxane (5 mL) using triethylamine (58 μL, 0.415 mmol) and 4-dimethylaminopyridine (DMAP) (51 mg, 0.415 mmol) as catalyst over 24 h at room temperature. It afforded 1.05 g of PTMC-(COOH)$_2$ with a yield of 100% and the molecular features of the polymer were $M_n$=6 120 g·mol$^{-1}$ and $M_w/M_n$=1.43.

FIG. 1 displays the $^1$H NMR spectra of the dihydroxy precursor PTMC-(OH)$_2$ and the parent α,ω-dicarboxylate telechelic PTMC-(COOH)$_2$. The signal corresponding to the terminal methylene proton in PTMC-OH$_2$ at δ=3.75 ppm disappeared completely whereas that of the new methylene group in α-position of the carboxylic function resulting from the ring-opening of the anhydride then appeared at δ=2.64 ppm along with the corresponding OH group at δ=5.62 ppm. Such data evidenced the quantitative functionalisation of PTMC by the carboxylic units.

Coupling of PTMC-(COOH)$_2$ (1.00 g, 0.163 mmol) with the five-membered glycerol carbonate (4-hydroxylmethyl-1,3-dioxolan-2-one; DMC-CH$_2$OH) (39 mg, 0.327 mmol) was then performed at room temperature in the presence of N,N'-dicyclohexylcarbodiimide (DCC) (77 mg, 0.327 mmol) and DMAP (10 mg, 0.327 mmol) as catalyst in CH$_2$Cl$_2$ (5 mL) for a period of time of 24 h as disclosed for example in Nederberg et al. (F. Nederberg, V. Trang, R. C. Pratt, A. F. Mason, C. W. Frank, R. M. Waymouth, J. L. Hedrick *Biomacromolecules*, 2007, 8, 3294-3297) or in Mespouille et al. (L. Mespouille, O. Coulembier, D. Paneva, P. Degee, I. Rashkov, P. Dubois, *J. Polym. Sci. A Polym. Chem.* 2008, 46, 4997-5013) or in Takizawa et al. (K. Takizawa, C. Tang, C. J. Hawker, *J. Am. Chem. Soc.* 2008, 130, 1718-1726) or in Li et al. (H. Li, R. Jerôme, P. Lecomte *Macromolecules*, 2008, 41, 650-654). It afforded 1.0 g of PTMC-(CH$_2$DMC)$_2$ with a yield of 100%. This esterification of hydroxyl end-groups was quantitative as demonstrated by $^1$H NMR analyses represented in FIG. 1. The characteristic signals of the hydroxyl group of C(O)OH end-units at δ=5.62 ppm completely disappeared in favour of the signals corresponding to the new cyclic carbonate (CH$_2$C(O)OCH$_2$CHCH$_2$), at δ=4.36, 4.58, 4.92 ppm, respectively. The methylene group resonance (CH$_2$C(O)OCH$_2$DMC at δ=2.69 ppm was maintained. The molar mass of the PTMCs as determined from these spectra were respectively of $\overline{Mn}_{NMR}$=2410 g/mol for PTMC-(OH)$_2$, 3810 g/mol for PTMC-(COOH)$_2$, and 5100 g/mol for PTMC-(CH$_2$DMC)$_2$). These values were in good agreement with those determined by size exclusion chromatography in THF, which were respectively of $\overline{Mn}_{SEC}$=2500 g/mol for PTMC-(OH)$_2$, 4000 g/mol for PTMC-(COOH)$_2$, and 5050 g/mol for PTMC-(CH$_2$DMC)$_2$). The polydispersity index values of PTMCs were respectively of 1.32 for PTMC-(OH)$_2$, 1.24 for PTMC-(COOH)$_2$, and 1.31 for PTMC-(CH$_2$DMC)$_2$. These polydispersities remained narrow throughout the various manipulations, thus demonstrating the efficiency of the procedures to selectively react with the terminal functions without deteriorating the carbonate backbone chain.

Figure 2:
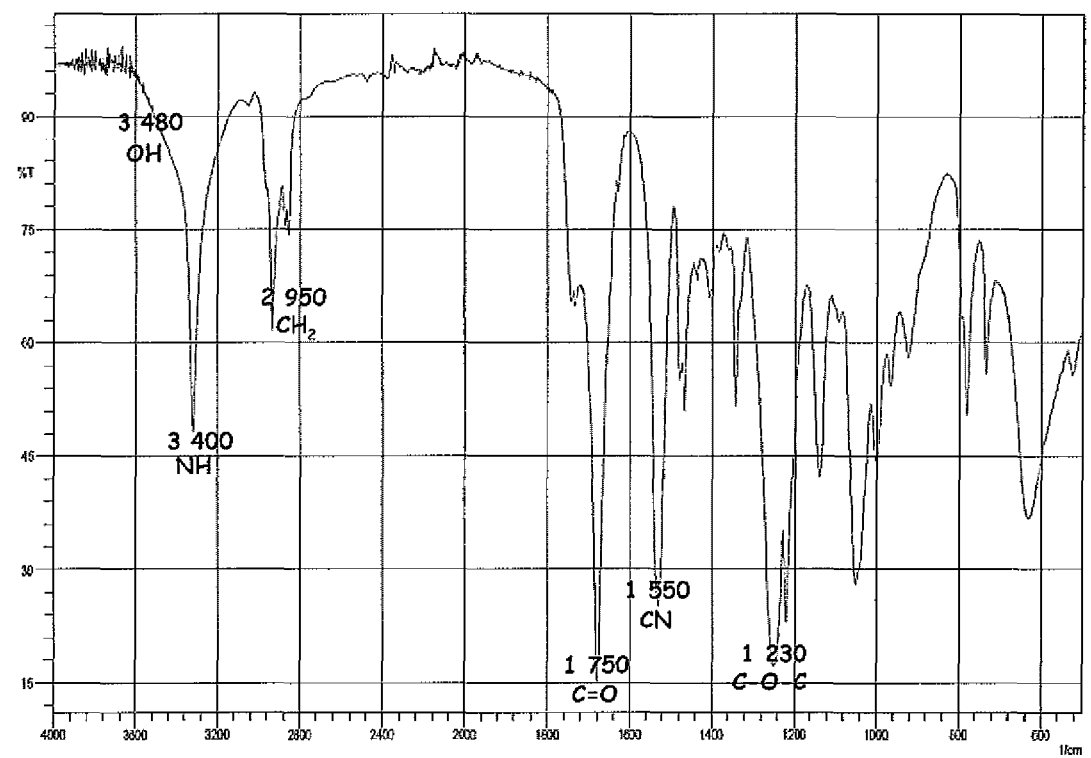
FIG. 2 represents a typical Fourier Transformed InfraRed (ATR-FTIR, Shimadzu apparatus) spectrum of a PTMCHU expressed as % Transmittance versus $cm^{-1}$.
Figure 3:
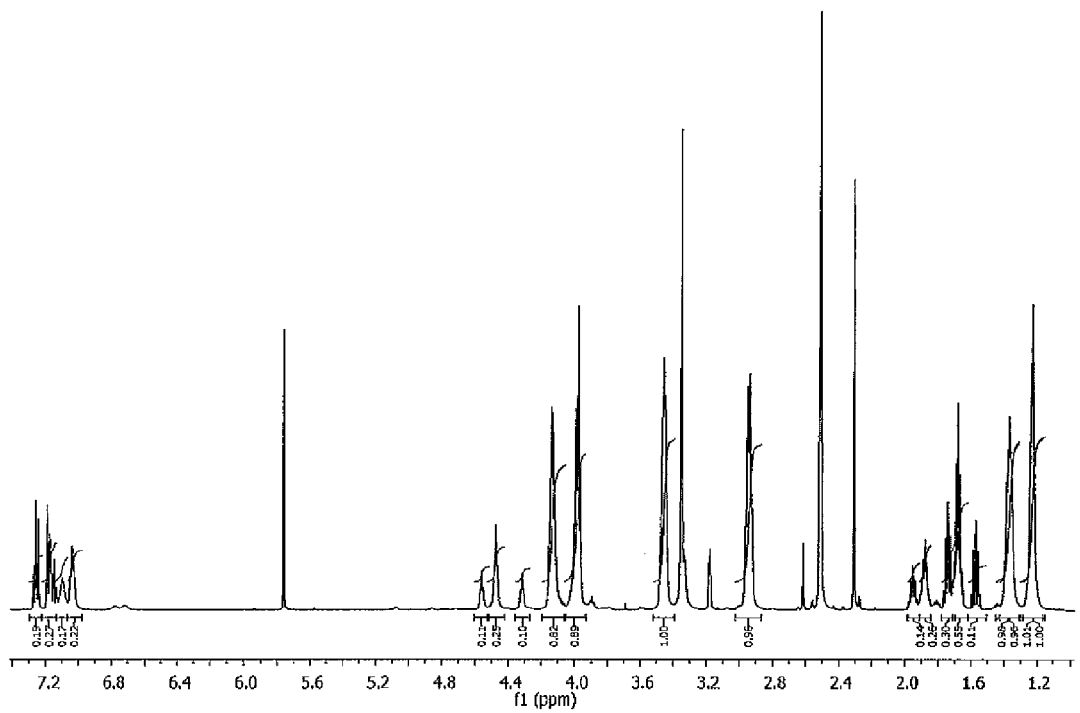
FIG. 3 represents a typical $^1$H NMR spectrum of a PTMCHU.
Figure 4:
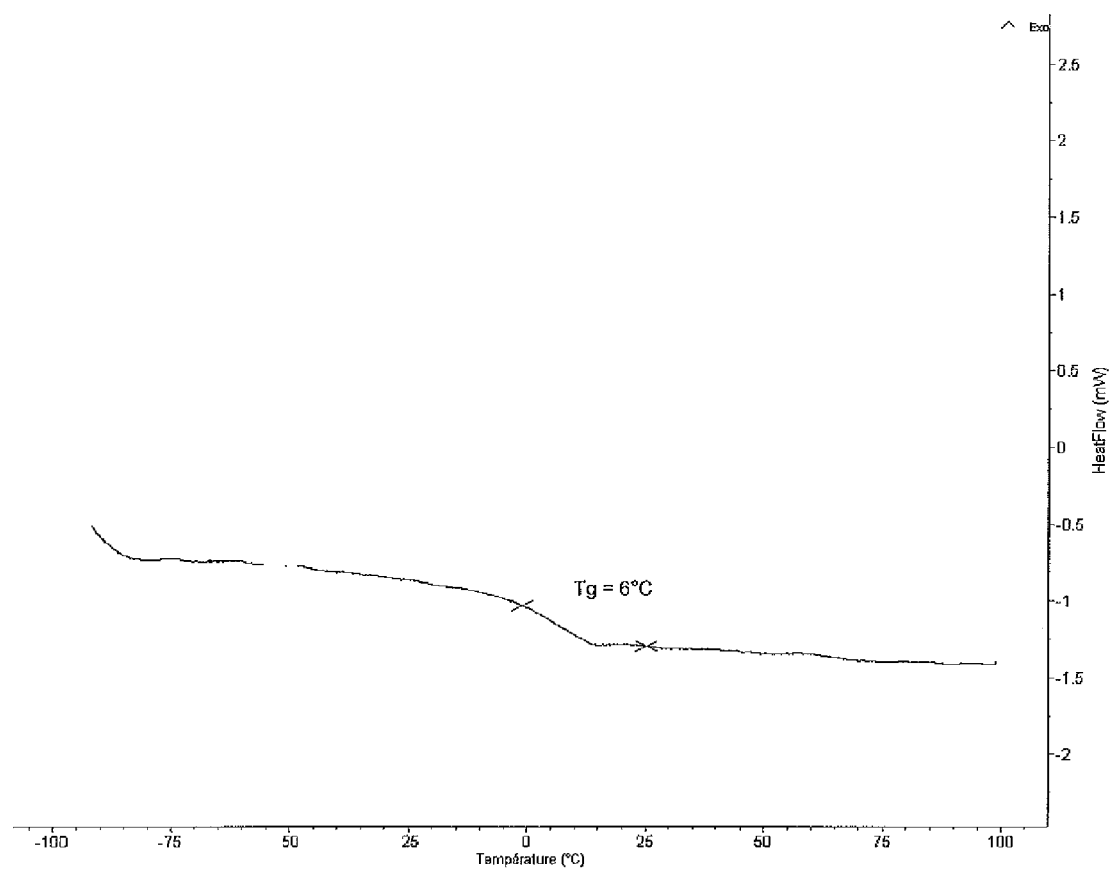
FIG. 4 represents a typical Differential Scanning calorimetry analysis of a PTMCHU (Setaram apparatus, 10° C./min heating rate). It represents the heat flow expressed in mW as a function of temperature expressed in ° C.

The polyaddition reaction of PTMC-(CH$_2$DMC)$_2$ (1.00 g, 0.172 mmol) with 1,6-hexamethylenediamine (10 mg, 0.862 mmol) was carried out in CH$_2$Cl$_2$ (4 mL) at a temperature of 70° C. over a period of time of 5 days (scheme 1). It afforded 0.9 g of product, with a yield of 82%. Determination of the molar mass of the PTMCU by SEC in DMF showed a unimodal and symmetrical peak ($\overline{Mn}_{SEC}$=68 100 g/mol, $\overline{Mw}/\overline{Mn}$=1.2), clearly shifted towards higher molar mass than the PTMC-(CH$_2$DMC)$_2$ reagent. As evidenced by $^1$H NMR spectroscopy, the polyaddition resulted in PTMCHUs displaying either primary or secondary hydroxyl groups, corresponding to either oxygen-acyl opening site of the DMC. The chemical structure of the PTMCHUs was also examined by FTIR as represented in FIG. 2. The spectrum displayed the characteristic vibrations of the urethane and of the carbonate groups. The most significant bands corresponded to the stretching vibrations of the carbonyl group in the carbonate and urethane at $v_{C=O}$=1750 cm$^{-1}$, and of the amide in the urethane at $v_{C-N}$=1550 cm$^{-1}$, $v_{N-H}$=400 cm$^{-1}$. Also illustrative of the carbonate segments were the peaks at v=2933 and 2861 cm$^{-1}$ assigned to the C—H stretching along with the 789 cm$^{-1}$ bands corresponding to the ester O=C—O bending. In addition, a broad peak at v=3466 cm$^{-1}$ overlapping with the N—H stretch corresponded to the O—H stretching. All these observations supported the formation of the PTMCHUs from the PTMC-(CH$_2$DMC)$_2$. FIG. 3 represents a typical $^1$H NMR spectrum of a PTMCHU and FIG. 4 represents a typical Differential Scanning calorimetry analysis of a PTMCHU (Setaram apparatus, 10° C./min heating rate)

The invention claimed is:

1. Poly(carbonate-urethane) or poly(ester-urethane) obtained by a process and characterised in that the poly(carbonate-urethane) has polycarbonate soft segments or the poly(ester-urethane) has polycarbonate soft segments, wherein the polycarbonate soft segments have molecular weights Mn ranging between 10,000 and 250,000 g/mol, wherein the process comprises the steps of:
a) immortal ring-opening polymerisation of a first 5-, 6-, or 7-membered cyclic carbonate or of a cyclic ester or diester monomers, bearing or not bearing functional groups, in the presence of a first catalyst system and in the presence of one or more diols or polyols acting both as co-initiators and chain transfer agents;
b) chemical modification of the hydroxyl chain-end groups into carboxylic groups in the presence of a second catalyst system;
c) coupling reaction with at least 2 equivalents of a second 5-, 6-, or 7-membered cyclic carbonates, bearing at least one functional group enabling coupling with the carboxylic moiety, in the presence of a third catalyst system;
d) polyaddition of a diamine or a polyamine via ring-opening of the second terminal 5-, 6-, or 7-membered cyclic carbonate of step c); and
e) obtention of poly(carbonate-urethane) or poly(ester-urethane);
wherein the poly(carbonate-urethane) or the poly(ester-urethane) is prepared without use of isocyanates.

2. Poly(carbonate-urethane) or poly(ester-urethane) according to claim 1, wherein the first catalyst system is selected from an organometallic compound, or from (LO)ZnR where LO is a multidentate phenolate ligand and R is Et or N(SiMe$_3$)$_2$, or from a Lewis acidic metal salt, or from an organocatalyst wherein the organocatalyst precursors are selected from 4-dimethylaminopyridine (DMAP) or 1,5,7-triazobicyclo-[4,4,0]dec-5-ene (TBD) or tert-butylimino-1,3-dimethylperhydro-1,3,2diazaphosphine (BEMP).

3. Poly(carbonate-urethane) or poly(ester-urethane) according to claim 1, wherein the first catalyst system is selected from amido-zinc β-diiminate (BDI)ZnN(SiMe$_3$)$_2$, or from a triflate compound M(OSO$_2$CF$_3$)$_n$, with M=Al or Bi.

4. Poly(carbonate-urethane) or poly(ester-urethane) according to claim 1, wherein the diol or polyol is of general formula R(OH)n where n is equal to 2 or more and R is a linear or branched, aliphatic or aromatic hydrocarbyl having up to 20 carbon atoms, or any combination thereof.

5. Poly(carbonate-urethane) or poly(ester-urethane) according to claim 1, wherein the ratio monomer/catalyst ranges between 1,000,000:1 and 100:1.

6. Poly(carbonate-urethane) or poly(ester-urethane) according to claim 1, wherein the ratio monomer/diol or polyol ranges between 10,000:1 and 10:1.

7. Poly(carbonate-urethane) or poly(ester-urethane) according to claim 1, wherein the chemical modification of step b) is carried out by reacting the polycarbonate or polyester obtained in step a) with an anhydride, optionally in the presence of an inert solvent.

8. Poly(carbonate-urethane) or poly(ester-urethane) according to claim 1, wherein the second catalyst system is a catalyst suitable for opening of an anhydride with an alcohol, selected from pyridine or from a mixture of triethylamine and 4-dimethylaminopyridine (DMAP).

9. Poly(carbonate-urethane) or poly(ester-urethane) according to claim 1, wherein the coupling reaction of step c) is carried out in the presence of a third catalyst system selected from pyridine or DMAP, optionally in the presence of a coupling agent.

10. Poly(carbonate-urethane) or poly(ester-urethane) according to claim 1, wherein the third catalyst system is loaded in an amount of 0.1 to 5% with respect to the second 5-, 6-, or 7-membered cyclic carbonates, bearing at least one functional group.

11. Poly(carbonate-urethane) or poly(ester-urethane) according to claim 1, wherein the polyaddition of step d) is carried out with a diamine or a polyamine of general formula R(NH$_2$)$_n$ where n is equal to 2 or more and R is a linear or branched, aliphatic or aromatic hydrocarbyl having up to 12 carbon atoms, or a combination thereof.

12. Poly(carbonate-urethane) or poly(ester-urethane) according to claim 11, wherein the ratio $NH_2$/cyclic carbonate ranges between 0.5 and 5.

13. Poly(carbonate-urethane) or poly(ester-urethane) according to claim 12, wherein the length of the polymer chain is determined by the ratio $NH_2$/cyclic carbonate.

14. Poly(carbonate-urethane) or poly(ester-urethane) according to claim 1, wherein the length of the polymer chain increases with increasing temperature of the polyaddition reaction.

15. Poly(carbonate-urethane) or poly(ester-urethane) according to claim 1, characterised in that polycarbonate soft segments have molecular weights Mn ranging between 50,000 and 100,000 g/mol.

16. Poly(carbonate-urethane) having polycarbonate soft segments or poly(ester-urethane) having polycarbonate soft segments, wherein the poly(carbonate-urethane) or the poly(ester-urethane) is characterised in that the polycarbonate soft segments have molecular weights Mn ranging between 10,000 and 250,000 g/mol, wherein the poly(carbonate-urethane) or the poly(ester-urethane) is prepared without use of isocyanates.

17. Poly(carbonate-urethane) or poly(ester-urethane) according to claim 16, characterised in that polycarbonate soft segments have molecular weights Mn ranging between 50,000 and 100,000 g/mol.

\* \* \* \* \*